March 6, 1956
J. P. TERRETT
2,737,374
FLUID COOLED INJECTION HEATER
Filed Dec. 12, 1952
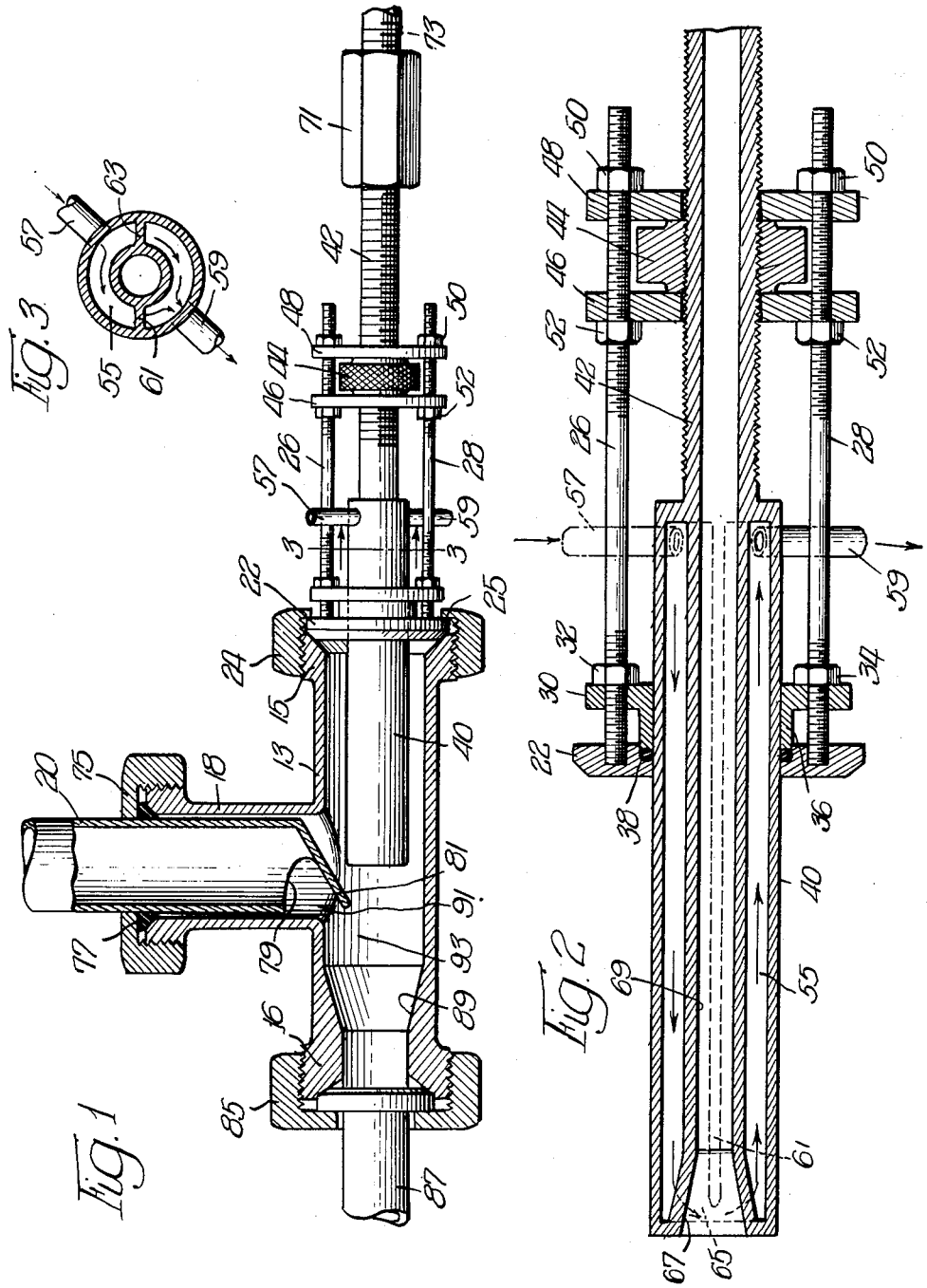
INVENTOR.
John P. Terrett,
BY

United States Patent Office 2,737,374
Patented Mar. 6, 1956

2,737,374

FLUID COOLED INJECTION HEATER

John Pottenger Terrett, San Francisco, Calif., assignor, by mesne assignments, to Foremost Dairies, Inc., Oakland, Calif., a corporation of New York Application December 12, 1952, Serial No. 325,737

5 Claims. (Cl. 261—9)

The present invention relates to a new and improved fluid cooled injection heater and more particularly to such a heater in which steam is injected into a stream of a liquid product for the purpose of heating such product to a given temperature.

While the apparatus may be used for a variety of purposes in connection with liquid food products such as fruit or vegetable juices and purees, it has particular application in the substantially instantaneous heating of liquid milk or milk products for the purpose of forewarming, sterilizing or otherwise treating the product. Injection heating has been used for such purposes, but heating in this manner presents numerous difficulties. The temperature and time of heating must be accurately controlled to properly treat the milk or other material while avoiding overheating from which may result damage to the flavor, an objectionable cooked flavor, or a darkening of the color of the product due to caramelization of sugars present. Any or all of these objectionable results or other damage to the product may arise when a portion of the product is overheated by a localized overheating action. It is important, therefore, that the heating steam be substantially uniformly mixed with the product being treated and that contact between the product and overheated nozzle surfaces be avoided.

It is an object of the present invention to provide a new and improved fluid cooled injection heater.

It is a further object to provide a heater of this character in which the injection nozzle has fluid cooled outer surfaces to avoid overheating of the liquid material being treated.

It is an additional object to provide apparatus of this character including a nozzle for directing the steam into the liquid material and a deflecting member adapted to control and direct the liquid flow across the steam jet.

It is another object to provide a construction in which the nozzle and deflecting member are relatively adjustable.

It is also an object to provide an apparatus which is simple in design, construction and operation and adapted for commercial use in the processing of liquid products to temperatures where, by the nature of the product, burning might be encountered in the event of overheating.

Other and further objects will appear as the description proceeds.

I have shown certain preferred embodiments of my invention in the accompanying drawing in which—

Figure 1 is a vertical view, partly in section, showing the assembled apparatus, Figure 2 is an enlarged longitudinal section of the nozzle assembly, and Figure 3 is a transverse section taken on line 3—3 of Figure 1.

In the drawings, the T-shaped body member 13 is provided with an inlet end 15 and an outlet end 16. The lateral portion 18 of the T receives a pipe 20 for the introduction of the material to be treated. The back plate 22 is secured against the inlet end portion 15 by means of a threaded collar 24 having a flange 25 overlying the backing plate. The two supporting rods 26 and 28 are threaded into the backing plate 22 and extend outwardly at right angles to that plate. A packing gland follower 30 is provided with perforations fitting over the support rods 26 and 28 upon which are threaded the nuts 32 and 34. Adjustment of these nuts 32 and 34 forces the circular flange 36 against the O ring 38 fitted in a recess in the back plate 22 to form a fluid-tight joint with the steam nozzle 40.

The steam nozzle 40 has a threaded extension 42 upon which is threaded an adjusting nut 44. The thrust plates 46 and 48 have a central perforation through which the threaded extension 42 of the nozzle passes freely. They also have openings through which the supporting rods 26 and 28 pass freely. The thrust nuts 50 back up the thrust plate 48, these nuts being threaded on rods 26 and 28. The oppositely faced thrust nuts 52 similarly back up the thrust plate 36.

The nozzle 40 is provided with a jacket 55 for the introduction of a cooling fluid which may be gas, air or a suitable liquid. The cooling fluid is introduced through a pipe 57 connected to the portion of the jacket 55 extending outwardly of the packing gland follower 30. The cooling fluid is drawn off through a pipe 59 located at 180° from the inlet pipe 57. The jacket space 55 is divided by baffles 61 and 63 which extend longitudinally of the space. As shown in Figure 2, the baffle 61, which is there indicated in broken lines, terminates short of the inner end of the jacket leaving a space 65 through which the cooling fluid passes from the upper portion of the jacket to the lower portion to return to the outlet pipe 59 as indicated by the arrows.

As shown in Figure 2, the discharge portion 67 of the steam passage 69 is flared outwardly and this flare may be on an angle of the order of 6°. As shown in Figure 1, the threaded extension 42 may be coupled by a suitable coupling member 71 to a steam supply pipe 73. It will be understood that the steam at the desired temperature and pressure may be supplied by any usual source.

The pipe 20 for the introduction of material to be treated is held in a desired position by flange nut 75 threaded on the portion 18 of the T-shaped body. This nut 75 compresses a packing ring 77 to retain the pipe 20 in place and form a fluid-tight joint. The lower end of pipe 20 has its walls cut away, as shown at 79, and is further provided with a deflecting baffle 81 which is inclined at an angle of 45° to the line of flow of the material being treated. This baffle 81 directs material being treated across the axis of the steam discharged from the nozzle 40 at an angle of 45° to that axis. It is to be noted that the baffle is preferably placed as shown with its lower edge beyond the discharge end of nozzle 40 and out of the line of flow of the steam of said nozzle. Thus, the baffle serves to direct the flow of the material being treated without interfering with the flow of steam from the nozzle 40.

The discharge outlet end 16 of the body member 13 is shown as provided with a flanged nut 85 holding a discharge pipe 87 in place to receive the treated material flowing from the heater. The adjacent walls of the body member are shown at 89 as conical in form to direct the material to the pipe 87.

The pipe 20 for introducing the material may be vertically adjusted to the most satisfactory position for introduction of the material being treated. This vertical adjustment will move the baffle 81 which is integrally connected to the pipe 20. This baffle 81, as shown, covers substantially the entire cross-sectional area of pipes 20 and directs the material at an angle through the passage 91 into the interior of the longitudinal bore 93 through the body member 13.

The steam nozzle 40 may be adjusted axially of the body member 13 by rotation of the adjusting nut 44. The nut 44 is constrained against longitudinal movement relative to the back plate 22 by the thrust plates 46 and 48. Rotation of the nut 44, therefore, since it is threaded on the nozzle extension 42, serves to move the nozzle inwardly or outwardly through the back plate 22 and the packing gland follower 30. The cooling fluid in the jacket area 55 prevents any overheating of material which may occupy the area surrounding the nozzle 40.

It will be understood that the present apparatus may be made in various sizes and proportions depending upon the material being treated and the rate of heat transfer desired. Milk or other products may be heated to temperatures as high as 300° or 310° F. without burning. As specific examples, a unit designed to raise seven thousand pounds of milk per hour from 180° F. to 260° F. would require roughly one inch of cross-sectional area of the body for each 180,000 B. t. u. exchange per hour. A jacketed steam nozzle of the type shown contains approximately .29 square inch cross-sectional of jacket area for 500,000 B. t. u. per hour transfer with a steam opening of .093 for each 500,000 B. t. u. per hour transfer. The discharge or outlet orifice may have a cross-sectional area of .95 square inch for each 500,000 B. t. u. per hour transfer. The product inlet nozzle may have a cross-sectional area of 1.0 square inch for this 500,000 B. t. u. per hour transfer. The cooling fluid may be either liquid or gaseous.

The present apparatus serves to efficiently heat the product to relatively high temperatures while preventing heat transfer from nozzle areas surrounded by the product to such a degree as would burn the product. It provides a construction in which the steam inlet position may be adjusted according to the product and capacity desired without shutting down the system. The apparatus may be operated by suitable positioning of the nozzle to induce the flow of the product, thus offsetting any tendency to development of back pressure in the material feed system. The apparatus may be constructed from standard sizes of pipe and tubing and may be readily opened and cleaned.

While I have shown a preferred embodiment of my invention, it is to be understood to be illustrative only as it is capable of variation to meet differing conditions and requirements and I contemplate such modifications as come within the spirit and scope of the appended claims.

I claim:

1. A fluid cooled injection heater comprising a body member having aligned inlet and outlet openings at its ends and a lateral opening for the introduction of material being treated, a back plate secured in the inlet opening, said plate having a central opening, a jacketed steam nozzle extending through the central opening with its discharge end adjacent the lateral opening in the body, and means connecting the back plate and nozzle whereby the nozzle may be moved in the body relative to the lateral opening, said means comprising supporting rods secured to the back plate, said rods supporting spaced thrust plates having aligned openings therein, a threaded extension on the nozzle extending through the thrust plate openings and an adjusting nut on the threaded extension between the spaced thrust plates.

2. A fluid cooled injection heater comprising a body member having aligned inlet and outlet openings at its ends and a lateral opening for the introduction of material being treated, a back plate secured in the inlet opening, said plate having a central opening, a jacketed steam nozzle extending through the central opening with its discharge end adjacent the lateral opening in the body, the nozzle jacket extending exteriorly of the back plate, longitudinally extending baffles in the jacket, said baffles extending from the exterior end of the jacket to a point adjacent the discharge end of the jacket, inlet and outlet passages connected to the exterior portion of the jacket on opposite sides of the baffles, and means connecting the back plate and nozzle whereby the nozzle may be moved in the body relative to the lateral opening.

3. A fluid cooled injection heater comprising a T-shaped body member having aligned inlet and outlet openings and a lateral opening for the introduction of material being treated, a pipe for the introduction of material to be treated extending through the lateral opening, means for clamping said pipe in adjusted position in the lateral opening, said pipe having an inclined baffle at its lower end to direct the material toward the outlet opening, a jacketed steam nozzle adjustably fitted in the inlet opening, and means for supplying a cooling fluid to said jacket.

4. A fluid cooled injection heater comprising a T-shaped body member having aligned inlet and outlet openings and a lateral opening for the introduction of material being treated, a pipe for the introduction of material to be treated extending through the lateral opening, means for clamping said pipe in adjusted position in the lateral opening, said pipe having an inclined baffle at its lower end to direct the material toward the outlet opening, a jacketed steam nozzle adjustably fitted in the inlet opening, and means for supplying a cooling fluid to said jacket, the baffle being spaced from the discharge end of the nozzle and from the line of flow from said nozzle.

5. A fluid cooled injection heater comprising a T-shaped body member having aligned inlet and outlet openings and a lateral opening for the introduction of material being treated, a pipe for the introduction of material to be treated extending through the lateral opening, said pipe having an inclined baffle at its lower end to direct the material toward the outlet opening, a jacketed steam nozzle adjustably fitted in the inlet opening, and means for supplying a cooling fluid to said jacket, the baffle being inclined at an angle of approximately 45° relative to the axis of the steam nozzle and being spaced from the discharge end of the nozzle and from the line of flow from said nozzle.

References Cited in the file of this patent

UNITED STATES PATENTS

| | | |
|---|---|---|
| 616,455 | Day | Dec. 27, 1898 |
| 1,232,756 | Best | July 10, 1913 |
| 1,798,336 | Nelson | Mar. 31, 1931 |
| 2,353,912 | Lindsey | July 18, 1944 |